Oct. 4, 1927.

E. H. SMITH

METHOD OF MAKING TORCH TIPS

Filed Nov. 15, 1926

Inventor
ELMER H. SMITH

By Paul, Paul + Moore

ATTORNEYS

Patented Oct. 4, 1927.

1,644,157

UNITED STATES PATENT OFFICE.

ELMER H. SMITH, OF MINNEAPOLIS, MINNESOTA.

METHOD OF MAKING TORCH TIPS.

Application filed November 15, 1926. Serial No. 148,560.

In the manufacture of a one piece oxy-fuel tip used in welding torches and like devices, it has been customary to take a solid block of metal, preferably copper, and elongated in form, and bore the same longitudinally to provide a series of comparatively small ducts spaced apart around a central bore, for leading the low pressure oxygen and fuel gas to a point where it will be burned in close proximity to the central duct. The tip is made comparatively long for convenience in reaching the work, and for the purpose of locating the frame of the torch at a point remote from the other parts to prevent damage thereto by over heating. In drilling it often happens that after some of the holes have been drilled, a drill will break when attempting to form another bore or opening. It is impractical to remove the broken part of the drill and thus the partly completed tip must be thrown aside, all the previous work thereon being wasted. The boring operation, in other respects than this, is expensive, and it has been found practically impossible to bore a long opening of small caliber in a straight line. Moreover if the openings are to converge inwardly toward the axis of the base adjacent the outer end of the tip, a straight bore must first be made from one end, and then a bore made from the opposite end to meet the first bore at an angle, and form a continuation. It is practically impossible to have the bores meet in the proper manner.

It is, therefore, an object of this invention to provide a method of forming the openings in such a tip which will eliminate the use of small drills and the drilling of long openings, and the present method provides means for forming non-linear passages of smaller uniform or non-uniform caliber, and of different cross-sectional configuration without the drilling or boring. The method further provides means whereby the openings may be furnished or made smooth and whereby the caliber may be made uniform. The features of the invention include the use of wires as cores introduced in openings formed in a solid piece; the swaging to reduce the diameter of the piece thus prepared, while the wires are in place, and to at the same time elongate or spread lengthwise the metal to form a tip of the desired length.

In the accompanying drawings, forming a part of this specification:

Figure 4:
Figure 4 is a view similar to Figure 3 showing one end of the tip tapered.
Figure 6:

Figure 6 corresponds to Figure 4, but shows the wires removed.

Figure 7:
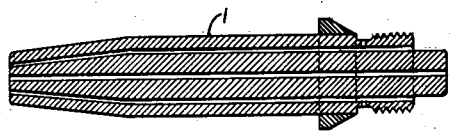

Figure 7 is a section view of the completed tip.

Figure 1:
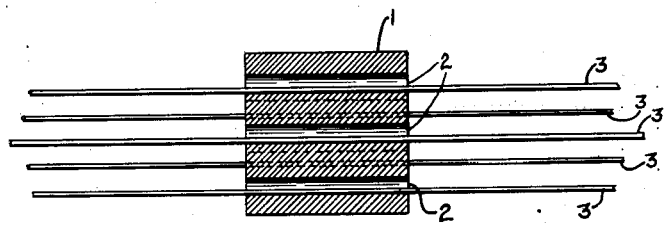
Figure 1 is a longitudinal section showing the block bored and with the wires in place.
Figure 2:
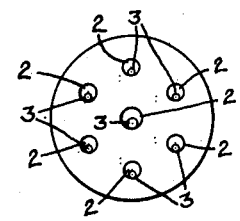
Figure 2 is an end view of Figure 1.
Figure 3:
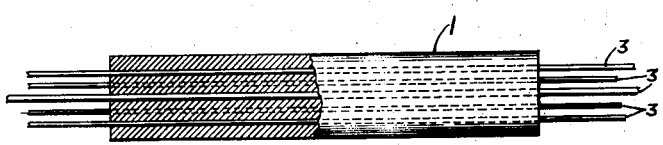
Figure 3 shows the swaging operation complete, the view being a sectional elevation.

In carrying out the invention, I select a piece of copper stock, for a certain size tip, for example a block 1 approximately an inch in diameter and an inch long, see Figures 1 and 2. I then bore openings 2 with comparatively large drills longitudinally of the block, that is parallel to its cylindrical axis, with the openings arranged in accordance with the design of the work in hand. I then introduce wires 3 into the openings, the wire at present in use being ordinary piano wire. The wires used as cores to prevent closing in of metal at those points at which it is desired to produce the finished, elongated bores, of small caliber. The diameter of the wires therefore corresponds, to the caliber of the openings desired in the finished tip.

The next step is a swaging operation which reduces the diameter of the block and elongates the same, the diameter then being approximately nine-sixteenths of an inch and the length about three inches. This operation is, however, continued until the desired length and diameter is obtained.

The next step is to withdraw the wires and in order to release the same, I heat the piece which acts to release the wire from its opening, to permit its withdrawal. A smooth bore is the result, having uniform diameter of from one thirty-second to one sixty-fourth of an inch. It is practically impossible to produce openings of this size uniformly by drilling, without breaking a drill. Moreover the process is a speedy one and very cheap.

Figure 5:
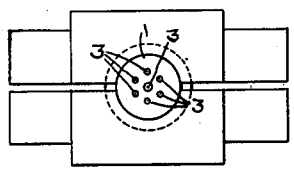
Figure 5 is a diagrammatic view of the swaging operation.

When it is desired to have those openings surrounding and lying outside of the central openings, converge toward the axis of the piece adjacent the outer end of the tip, I then taper that end of the tip by swaging while the wires are in place. The result is shown in Figures 4 and 6. A swaging device is conventionally illustrated in Figure 5. The finished tip is shown in Figure 7.

I claim as my invention:

1. Method for producing torch tips which consists in boring a solid section of a ductile metal, disposing wires within the bores and swaging to reduce the diameter and lengthen the section.

2. A method for producing one piece torch tips, which consists in taking a section of comparatively soft metal having a series of openings therein, disposing wires within the openings, then swaging to reduce the diameter of the section and lengthen the same.

3. A method for producing torch tips having a series of fine openings lengthwise therethrough, which consists in boring a piece of block copper, placing a core wire in each bore and swaging to lengthen the piece, then heating the piece, and withdrawing the wires.

4. A method of producing torch tips having a series of fine openings lengthwise therethrough, which consists of boring a series of parallel openings through a piece of block copper, placing a core wire in each bore and swaging the metal about the wires to lengthen and reduce the diameter of the piece.

5. A method of producing torch tips having a series of fine openings lengthwise therethrough, which consists of boring a series of parallel openings through a piece of block copper, placing a core wire in each bore and swaging the metal about the wires to lengthen and reduce the diameter of the piece, and then heating the piece and withdrawing the wires, while heating.

6. A method for producing one piece torch tips which consists in taking a section of copper having a series of openings therein, disposing wires within the openings, then swaging to reduce the diameter of the section and lengthen the same, about the wires.

7. A method of producing torch tips having a series of fine openings lengthwise therethrough which consists of boring a series of parallel openings through a piece of block copper placing a core wire of less diameter than the bore, in each bore, and swaging the metal about the wires to lengthen and reduce the diameter of the piece.

In witness whereof, I have hereunto set my hand this 10th day of November 1926.

ELMER H. SMITH.